United States Patent Office 3,294,955
Patented Dec. 27, 1966

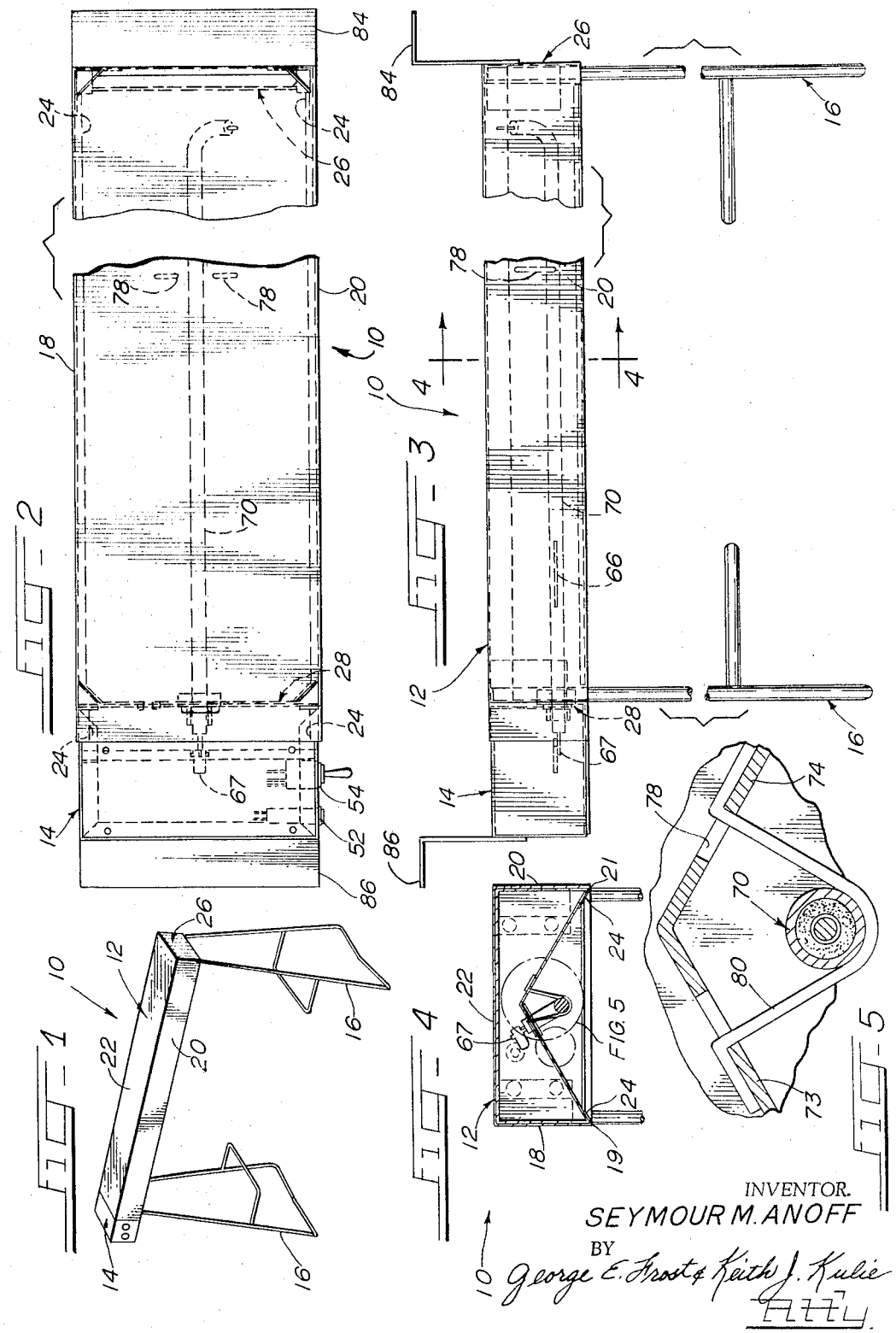

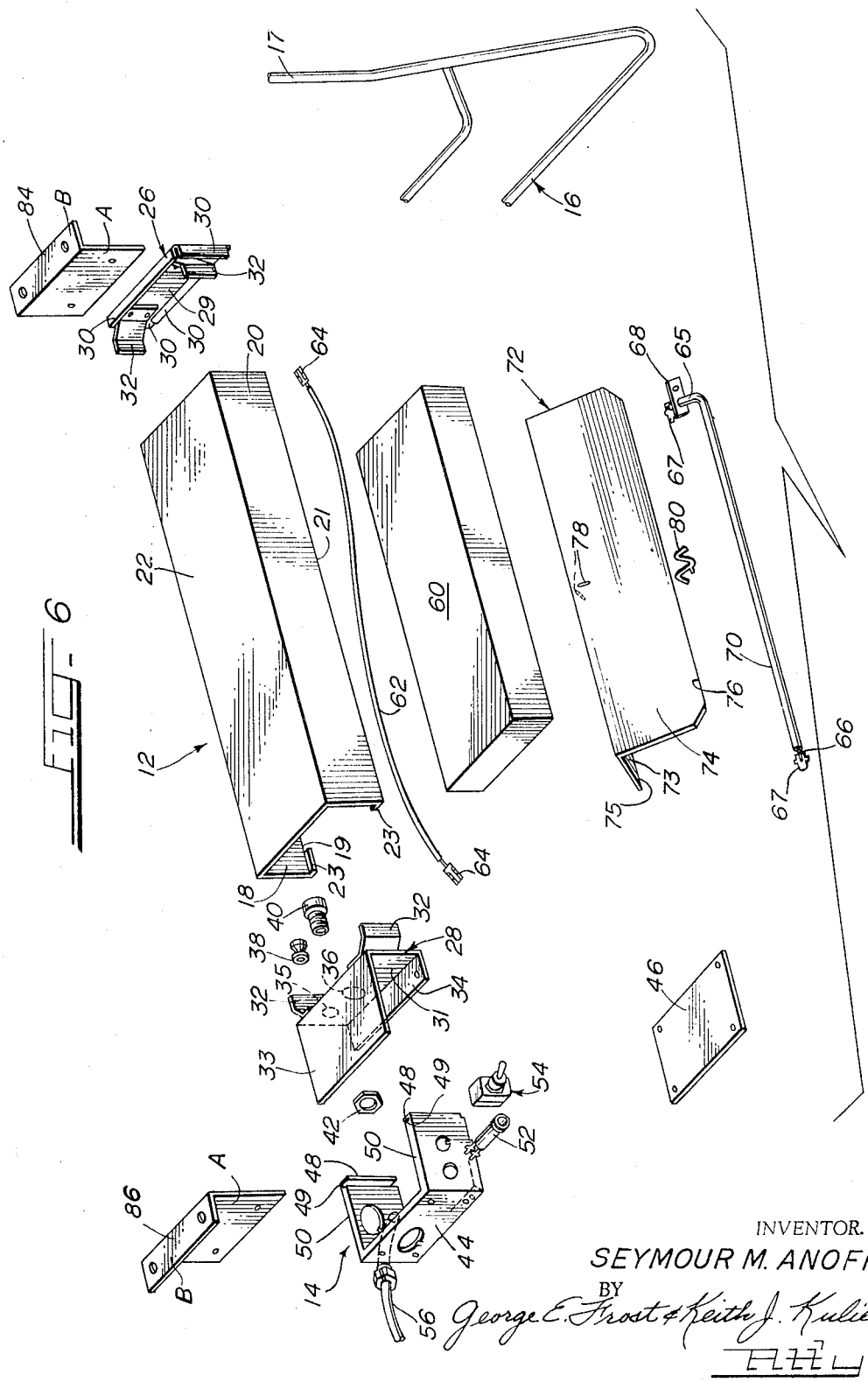

3,294,955
FOOD WARMING APPARATUS
Seymour M. Anoff, 528 Jackson St.,
Glencoe, Ill. 60022
Filed Nov. 13, 1963, Ser. No. 323,347
3 Claims. (Cl. 219—347)

The present invention relates to an improved food warming apparatus.

Preparation of food in large restaurants, hospitals or other large institutions generally can not be done on a serve-as-ordered basis. Frequently a significant delay is encountered between the time that the food is prepared and the time that it is served. In such cases it is necessary to maintain the prepared food at elevated temperatures so that it will be hot when served. To best maintain the food in prepared condition both as to temperature and physical characteristics the storage area may be heated to a predetermined level. In this manner the thermal differential between the prepared food and the surrounding area is lessened and the heat transfer rate from food to atmosphere is lessened. Food may be stored prior to serving by infra-red warming apparatus thereby extending the time interval between completion of preparation and serving the food in a warm, moist condition.

Many infrared food warming elements presently available employ quartz or glass enclosed electrical filaments with rigid plug-in connections, or the like, at either end. The rigid interconnection requires the use of filament containing elements with a very low coefficient of expansion. This limitation, and others, increases the cost and reduces utility of such apparatus. It should be observed also that a relatively high incidence of breakage is characteristic of glass or quartz elements.

The present invention is directed to the provision of an improved food warming apparatus that may easily be assembled and having a snap-in reflector element. The improved apparatus of the present invention is further characterized in that a non-breakable heating element is received in extensible mounting means.

It, accordingly, is a general object of the present invention to provide an improved food warming apparatus.

A further object of the present invention resides in the provision of an improved food warming apparatus that is easily assembled.

Another object of the present invention resides in the provision of an improved food warming apparatus having extensible mounting means for the heating element.

A further object of the present invention resides in the provision of an improved food warming apparatus having a snap-in reflector element.

An additional object of the present invention resides in the provision of an improved food warming apparatus having a non-breakable heating element and having mounting means for said element to permit unrestricted expansion thereof in use.

A further object of the present invention resides in the provision of an improved food warming apparatus having snap-in leg receiving elements.

Another object of the present invention resides in the provision of an improved food warming apparatus that is economical to manufacture, easy to assemble and use, that is durable in use and that may be used in any of several forms.

The novel aspects of the present invention are set forth in the claims appended hereto. The invention itself along with other objects and advantages thereof any best be understood by reference to the following description taken in conjunction with the drawings, in which:

FIGURE 1 is a perspective view of the food warming apparatus of the present invention;

FIGURE 2 is an enlarged fragmentary top view of the food warming element of FIGURE 1 showing the mounting of the heating element and the electric power connection means;

FIGURE 3 is a fragmentary side elevation view of the apparatus of FIGURE 2 illustrating installation of the shelf mounting brackets and the support stand;

FIGURE 4 is a cross-sectional view of the apparatus of the present invention taken along lines 4—4 of FIGURE 3 illustrating mounting of the reflector element and position of the heating element with respect to said reflector;

FIGURE 5 is a fragmentary enlarged view of the heat element mid-support member; and FIGURE 6 is an exploded perspective view of the food warming apparatus of the present invention.

Referring more particularly now to the drawings and specifically to FIGURE 1, the food warming apparatus of the present invention is indicated generally at 10. The warmer apparatus includes a box-like member 12, an electrical outlet and control box 14 and optionally may include a support stand 16.

Member 12 includes side walls 18 and 20 integral with a back wall 22 extending therebetween. Each of the side walls 18 and 20 terminate in a free end 19 and 21, respectively, spaced from the back wall 22. An upturned flange 24 extends along the length of the free ends of each of said side walls, said flange being angled slightly upwardly, as illustrated in FIGURE 4 of the drawings. It should be observed that the flanges 19 and 21 may extend along only a portion of the length of each side wall and may be orthogonally related to the side walls rather than angled upwardly, or angularly related in some other fashion.

The back wall 22 of the apparatus may be formed integrally with the side walls thereof or may be rigidly affixed thereto by any conventional fastening means such as by bolts, clips, or the like. In the form illustrated in the drawings the back wall is shown to be integrally formed with the side walls of the box-like shield member of the food warming apparatus.

End caps 26 and 28 are receivable in the end openings of the box-like member 12 of the apparatus. End cap 26 is defined by a plate 29 having folded flange portions 30 along each edge portion thereof. The flanges 30 of the end cap 26 are adapted to be received in the inside faces of the back wall and side walls of the apparatus. The ends of each side wall 18 and 20, respectively, define turned in flanges 23, as best seen in the exploded view of FIGURE 6. The flanges 30 of the end cap 26 are spaced such that they are deflectably received in the opening defined at the right end of the box-like member as seen in FIGURE 6. The flanges 30 are deflected inwardly at the top and bottom thereof between the back wall 22 of the apparatus and the flanges 23 at the end of the side walls 18 and 20. The side flanges 30 of the end cap 26 are deflected inwardly by the side walls 18 and 20 of the apparatus. In this manner the end cap is frictionally engaged within the opening. It should be observed that the end cap 26 may be bolted to the box-like member 12 by inserting suitable bolt fasteners, or the like, through mating openings in one or more of the flanges 30 of the cap 26 and in adjacent portions of the side walls, back face or flanges 23. Other fastening means may be employed to affix the end cap 26 to the member 12, many of which are known in the art.

The end cap 26 includes retainer elements 32 which elements are rigidly affixed to the plate 29 of the cap. Each of the retainer elements 32 is defined by a pair of spaced orthogonally related portions joined by a diagonal portion, as illustrated in FIGURE 6 of the drawings. One of the orthogonally related portions is placed on the plate 29 of cap 26 and is affixed thereto by riveting, bolting or other fastening means. The retainers 32 of the end cap 26 thereby define a generally triangular shaped opening between the diagonal portion of said retainer, the plate 29 of the cap 26 and the adjacent side wall 18 or 20 of the box-like member 12. This triangular shaped opening provides means for entrapment of the terminal portion of the upstanding members 17 of the support stand for the apparatus. In this manner the member 12 may be supported by the stand 16 away from a given shelf or table surface a predetermined desired distance.

The end cap 28 is constructed in much the same manner as that defined in conjunction with the description of cap 26 with some modifications. The cap 28 includes a plate 31 and retainer elements 32. The retainer elements 32 are constructed in the same manner as that set forth in describing cap 26 and they are mounted similarly to define the leg receiving openings for affixing the support stand 16 therein. Cap 28 is modified to the extent that it, preferably, does not include the flanges 30 of the cap 26. Instead the cap 28 is provided with a top flange 33 and a bottom flange 34. The cap 28 may be affixed in the opening at the left of the member 12 (as seen in FIGURE 6) by machine bolts, screws, soldering, riveting, or other conventional fastening means, the specific fastening means forming no part of the present invention. The plate 31 is provided with an opening 36 extending therethrough. A bushing 38 of a suitable insulating material is disposed within the opening 36 of the cap 28. A heating element support member 40 is telescopically received within the opening 36, one portion of the member 40 which extends through said opening being threaded. A nut 42 is threadably received on the threaded portion of the member 40 and is adapted to affix the member 40 rigidly with respect to the plate 31 of the apparatus.

The electrical outlet and switch box 14 is defined by the U-shaped portion 44 in combination with the upper flange 33 and the plate 46 which plate is separably joined to the apparatus. The U-shaped portion 44 is provided with inturned flanges 48 which are received on the inside face of the plate 31 so that the slots 49 are received on the plate 31 with the flanges 48 in the inner face and flanges 50 on the outer face in straddling relation to the plate 31. With the U-shaped portion 44 mounted to the plate 31 the top flange 33 of said plate will extend over the top opening of the portion 44 to define the top cover of the outlet box. Plate 46 then is mounted to the portion 44 and flange 34 of the cap 28 to define the bottom closure portion of the box 14.

In the completed assembly a pilot light 52 connected in series with the heating unit is mounted in the box 14 so that the bulb portion thereof extends to the exterior of the box in view of the user of the apparatus. An on-off switch member 54, connected in series with the heating element (described hereinbelow) and the pilot light of the apparatus, is mounted in the box 14 adjacent the pilot light, as illustrated in FIGURES 2 and 6 of the drawings. The supply line 56 from the power source (not shown) extends into the box 14, as illustrated, and is electrically connected through the pilot light and switch to either end of the heating element.

An insulating material, indicated at 60 in FIGURE 6, is insertable into the box-like element 12 of the apparatus. The material 60 generally is about the same size as the internal dimension of the box-like element.

A power supply lead 62 having female electrical connecting terminals 64 is provided for insertion into the wireway of the apparatus. The wireway is generally defined in the area between the box-like member 12 and the reflector (described below) when in assembled relation.

A heating filament 66 having male end terminals 67 is included in the food warming apparatus and preferably is received within a suitable metal alloy heat radiating tube 70. The heating filament 66 is disposed within the tube 70 with the terminals 67 extending beyond the ends of the tube. The end terminals 67 of the filament are adapted to be slidably received within mating female terminals of the type noted at 64 of the lead 62. The tube 70 is electrically insulated from the heating filament 66 so that there is no danger of electrical shock from contact with the tube itself.

As seen in the illustration of FIGURE 6 the tube 70 is L-shaped and defines a short leg portion 65. A mounting bracket 68 is rigidly affixed to the short leg portion 65 of the tube when in assembled relation in the completed unit.

A reflector element 72 is provided for the food warming apparatus. The reflector 72 is defined by angularly related reflector plates 73 and 74 each terminating in a free end, 75 and 76, respectively. The free ends 75 and 76 preferably are in spaced apart relation a distance at least as great as the spaced apart distance of the flanges 24 of the side walls. A pair of slots 78 are provided in the reflector plates adjacent the joined area thereof. A support bracket 80 is adapted to be mounted within the slots 78 as seen in FIGURE 5 to support the heat radiating tube 70 of the apparatus at a point approximately at its mid-length position to prevent sag of the tube during use.

The apparatus is assembled by insertion of the insulating block 60 within the box-like member 12. The electrical lead 62 then is positioned on the insulating material with one terminal 64 extending adjacent either end of the member 12. The short leg 65 of the heating tube 70 is inserted through an opening in the reflector 72 and the mounting bracket 68 rigidly affixed thereto. The mounting bracket then is rigidly affixed to the reflector element so that the short leg 65 of the tube 70 is rigidly positioned with respect to the reflector 72 of the apparatus.

The reflector element 72 then is mounted into the box-like member 12 by flexing the plates 73 and 74 slightly inwardly and placing the free ends 75 and 76 upon the shoulders defined by the flanges 24 of the side walls 18 and 20. In this manner the spring-like flexure of the plates 73 and 74 will urge them outwardly and into engagement with the side walls 18 and 20 and prevent accidental withdrawal or displacement of the reflector element 72.

The end caps 26 and 28 then are affixed within the end openings of the member 12 to define the enclosed food warming apparatus. The electrical outlet box 14 is affixed and defined in the manner described hereinabove.

The support bracket 80 is moved into engagement with the tube 70 and the legs of the bracket then are slipped into the slots 78 of the reflector plates to position and support the tube 70 at its mid length position.

The lead 62 is threaded through the opening in the bushing 38 with one end thereof extending into the outlet box for connection to one side of the power supply. The tube 70, as noted above, is rigidly affixed at one end (the short leg portion 65) to the reflector member 72 and thus is rigid with respect to the box member 12. The tube 70 extends telescopically through the support member 40 with the opposite terminal thereof projecting into the outlet box 14. It should be observed that the "other" end of said tube 70 is connected to the power supply by a flexible lead so that the tube is free to expand longitudinally with respect to the food warming apparatus member 12. Thus during heating in use the heating element is free to move through the end wall defined by the cap 28, the unrestricted mounting providing means for use of a metal alloy heating tube which is more durable in use than the conventional quartz or glass tube heating elements.

Electrical connection of the apparatus is made during assembly thereof and involves insertion of the terminal 67 adjacent the leg 65 of the filament 66 into the female terminal 64 of the lead 62 closest thereto. The other terminal 67 of the heating filament is connected through a short flexible lead (not shown) to the switch element 54 and then through the pilot light 52 to one side of the power supply. The other terminal 64 of the lead 62 may be connected directly to the other side of the power supply to complete the circuit.

The box-like member 12 with the outlet box 14 affixed thereto may be supported by the support stand 16 or suspended beneath a shelf, or the like, in the manner described below.

If the support stand 16 is employed the upstanding terminal portions 17 of the stand are inserted into the triangular shaped openings defined by the retainers 32 in combination with the side wall members 18 and 20 and the plates 29 and 31 of the end caps 26 and 28, respectively. The retainers are spring-like elements and frictionally engage the terminals 17 hold them in engagement with the member 12. The stand 16 is adapted to hold the heating element of the food warmer a predetermined desired distance from a shelf, table top, or the like. When the food warming apparatus is in use the food is placed beneath the member 12 and the switch moved to closed position to turn the heating element to "on" position. The heating filament heats the metal alloy tube 70. The tube 70 when heated gives off infra-red radiation which warms the area beneath the heating element in which the area the cook food is placed. The temperature differential between the food to be "warmed" and the area beneath the food warmer in which the food is placed is significantly reduced when the food warming unit is on. In this manner the heat transfer rate from the food to the atmosphere is reduced and the food cools at a much slower rate than if it were placed in an area where the atmosphere was at room temperature. The infrared radiation also enters the food itself to impart heat to cause a slight heating of the food particles thereby futher reducing the cooling rate of the food placed beneath the food warming apparatus.

It is known in the art that heat may be lost from a body even though no material substance is in contact with that body. The energy lost in the form of heat is lost through a process known as radiation. It also is known that any body receiving the radiation is warmed through the setting in motion or further agitation of the molecular structure of the body. It is in this latter manner that the energy transmission or rate of heat transfer may be reduced with the food warming apparatus of the present invention.

If the food warming apparatus 10 is to be supported beneath a shelf, cabinet, or the like, then mounting brackets 84 and 86 are affixed to the member 12. The brackets 84 and 86 are rigidly attached to the outer faces of the end cap 26 and the outlet box 14, respectively. The brackets 84 and 86 each define an L-shaped member with a long leg A and a short leg B. The leg A is affixed to the end cap and outlet box as defined above. The short leg B defines a flange to provide means for affixing the brackets 84 and 86 and thereby the food warming apparatus to a shelf, cabinet, or the like.

While a specific embodiment of the present invention is shown and described it will, of course, be understood that other modifications and alternative constructions may be used without departing from the true spirit and scope of the invention. It is intended by the appended claims to cover all such modifications and alternative constructions as fall within their true spirit and scope.

What I claim as new and desire to secure by Letters Patent of the United States, is:

1. An improved electrical food warming apparatus having a heating element connectable across a power source, said apparatus comprising:

a first member having a pair of side walls and a back wall extending therebetween to define a box-like member open at either end and along the face opposite the back wall, said side walls terminating in a free end spaced from said back wall, each said free end having flanges along at least a portion of the length thereof;

an insulating material disposed in said first member against the back wall;

a reflector element in said first member disposed against the insulating material, said element defining edges in spaced apart relation, one edge being received in each flanged free end of the side walls of said first member;

an end cap mounted in each open end of the first member, each cap having retainer elements affixed thereto, each of the retainers in conjunction with the end caps and adjacent side wall defining a support leg receiving sockets having an open end facing the same direction as the open face of the first member, one of said end caps having an opening extending therethrough;

a heating element connected at one end through a flexible lead to one side of the power source, said one end being telescopically supported by said first member, the other end of said element being rigidly supported by the reflector element and being connected to the other side of said power source, said heating element extending lengthwise of said apparatus and being pendulously supported along its length in spaced relation to said reflector, whereby when said element is placed in heating condition heat will be reflected and focused by said reflector element and said heating element is free to expand longitudinally by telescopic movement through the opening in said one end cap thereby to prevent thermal distortion of the heating element during use.

2. An improved electrical food warming apparatus having a heating element connectable across a power source, said apparatus comprising:

a first member having a pair of side walls and a back wall extending therebetween to define a box-like member open at either end and along the face opposite the back wall, said side walls terminating in a free end spaced from said back wall, each said free end having flanges along at least a portion of the length thereof, said flanges being folded toward the opposite side wall;

an insulating material disposed in said first member against the back wall;

a reflector element in said first member disposed against the insulating material, said element defining edges in spaced apart relation, one edge being received in each flanged free end of the side walls of said first member, said reflector element being biased into engagement with said flanges by the insulating material;

an end cap mounted in each open end of the first member, each cap having retainer elements affixed thereto, each of the retainers in conjunction with the end caps and adjacent side wall defining a support leg receiving socket having an open end facing the same direction as the open face of the first member, one of said end caps having an opening extending therethrough;

a heating element connected at one end through a flexible lead to one side of the power source, said one end being telescopically supported by said first member, the other end of said element being rigidly supported by the reflector element and being connected to the other side of said power source, said heating element extending lengthwise of said apparatus and being pendulously supported along its length in spaced relation to said reflector, whereby when said element is placed in heating condition heat will be reflected and focused by said reflector element and said heating element is free to expand longitudinally by telescopic movement through the opening in said one end cap thereby to prevent thermal distortion of the heating element during use.

3. An improved electrical food warming apparatus having a heating element connectable across a power source, said apparatus comprising:

a first member having a pair of side walls and a back wall extending therebetween to define a box-like member open at either end and along the face opposite the back wall, said side walls terminating in a free end spaced from said back wall, each said free end having flanges having along at least a portion of the length thereof, said flanges being folded toward the opposite side wall;

an insulating material disposed in said first member against the back wall;

a reflector element disposed against the insulating material, said element defining edges in spaced apart relation a distance at least as great as the spaced apart distance of the side walls of said first member, one edge being received in each flanged free end of the side walls of said first member, said reflector element being biased into engagement with said flanges by the insulating material;

an end cap mounted in each open end of the first member, each cap having retainer elements affixed thereto, said retainer elements being deflectably received against the side walls of said first member to frictionally mount said caps to said first member, each of the retainers in conjunction with the end caps and side walls defining a support leg receiving sockets having an open end facing the same direction as the open face of the first member, one of said end caps having an opening extending therethrough;

a heating element connected at one end through a flexible lead to one side of the power source, said one end being telescopically supported by said first member, the other end of said element being rigidly supported by the reflector element and being connected to the other side of said power source, said heating element extending lengthwise of said apparatus and being pendulously supported along its length in spaced relation to said reflector, whereby when said element is placed in heating condition heat will be reflected and focused by said reflector element and said heating element is free to expand longitudinally by telescopic movement through the opening in said one end cap thereby to prevent thermal distortion of the heating element during use.

References Cited by the Examiner

UNITED STATES PATENTS

| 2,627,014 | 1/1953 | Kolb | 219—349 |
| 2,879,369 | 3/1959 | Huseby | 219—347 X |
| 3,008,030 | 11/1961 | Stanford et al. | 219—347 |
| 3,143,629 | 8/1964 | Appel et al. | 219—347 |
| 3,152,241 | 10/1964 | Ammerman | 338—316 X |

FOREIGN PATENTS

| 1,120,122 | 4/1956 | France. |
| 591,752 | 8/1947 | Great Britain. |

ANTHONY BARTIS, *Primary Examiner.*